Jan. 27, 1925.

J. L. BURNS

HANDLE GRIP BRACKET

Filed Jan. 29, 1924

1,524,168

J. L. Burns
Inventor

By Clarence A. O'Brien
Attorney

Patented Jan. 27, 1925.

1,524,168

UNITED STATES PATENT OFFICE.

JOHN LLOYD BURNS, OF SANTA ANA, CALIFORNIA.

HANDLE-GRIP BRACKET.

Application filed January 29, 1924. Serial No. 689,299.

*To all whom it may concern:*.

Be it known that I, JOHN LLOYD BURNS, a citizen of the United States, residing at Santa Ana, in the county of Orange and State of California, have invented certain new and useful Improvements in Handle-Grip Brackets, of which the following is a specification.

This invention relates to handle grip brackets especially adapted to be applied to the handle of a scoop shovel and it consists in the novel features hereinafter described and claimed.

An object of the invention is to provide a bracket of simple and durable form which may be applied to the shovel handle at any point along the length thereof and which will hold a handle grip spaced from the shovel handle and disposed with its longitudinal dimensions at a right angle to the length of the shovel handle.

With this object in view the bracket structure includes a blank of sheet metal having incisions cut therein and at the opposite side portions thereof, the material within the incisions adapted to be bent out of the plane of the blank to form spanning legs adapted to straddle the shovel handle. A traction bolt is passed transversely through the said legs and may be used for clamping the legs and the bracket upon the shovel handle. The end portions of the bracket are curved upwardly in the form of arms and the handle grip is mounted between the upper ends of the said arms and bridges the space between them.

In the accompanying drawing:—

Figure 1:
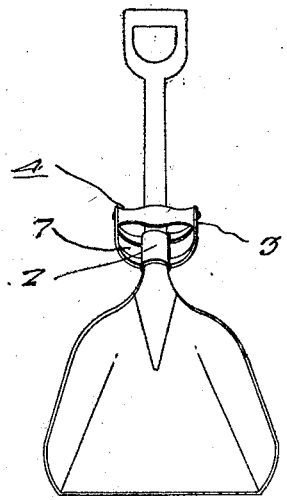
Figure 1 is a perspective view of a shovel with the handle grip or bracket applied to the handle of the shovel.
Figure 3:
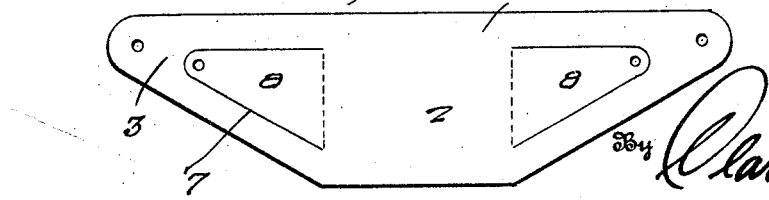
Figure 3 is a plan view of the blank from which the handle grip bracket is formed.

The handle grip bracket is formed from a single blank of sheet metal which is indicated in general at 1 in Figure 3 of the drawing. The blank 1 is provided with an intermediate portion 2 which when the bracket is formed up is curved in the form of an arc to fit against the side of the shovel handle as hereinafter explained and when the bracket is applied to the same handle. The blank 1 is further provided with end portions 3 which are adapted to be bent up parallel to each other and form the arms of the bracket structure. The said arm portions 3 when extended up are curved or bowed outwardly as shown in Figure 1 of the drawing and a handle grip 4 is mounted between the said arms and is disposed upon a pin 5 which passes transversely through the arms and traverses the length of the said handle grip. When the bracket is applied to the shovel handle 6 the grip 4 is spaced from the said handle and disposed with its longitudinal dimension at a right angle to the length of the handle 6. The arm portions 3 of the blank are provided with incisions 7 and the material between the end portions of the said incisions is bent down and curved in the form of an arc and is carried around the shovel handle 6 in the form of legs 8. The legs 8 are provided with parallel extremities 9 and a bolt 10 passing transversely through the said extremities and a nut 11 is screwed upon the end of the said bolt and bears at one face against the outer surface of one of the extremities. When the nut 11 is tightened, the extremities 9 are drawn toward each other whereby the leg portions 8 are clamped in position upon the handle 6.

Figure 2:
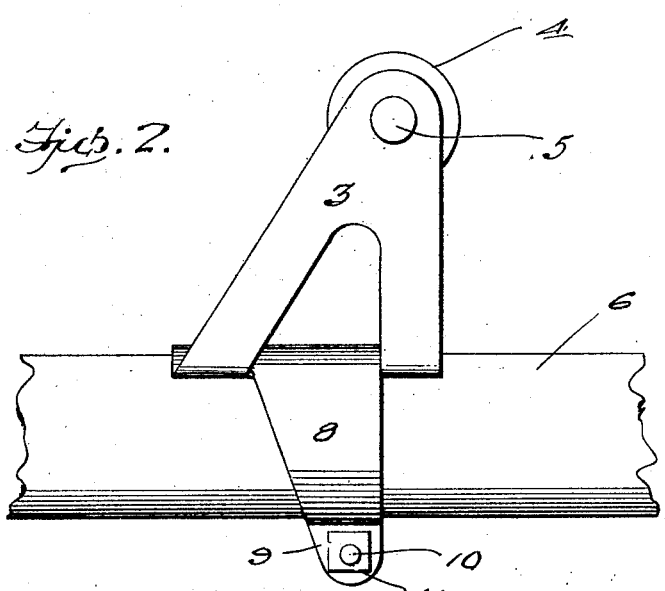
Figure 2 is an enlarged fragmentary view of the shovel handle with the handle grip mounted thereon.

The edge portions of the arms 3 are disposed at acute angles with relation to each other and are positioned beyond the side edges of the leg portions 8 as best shown in Figure 2 of the drawing, whereby the arm portions are braced with relation to the leg portions and the intermediate portions of the bracket and a strong and durable supporting structure for the handle grip 4 is provided.

Having described the invention, what is claimed is:—

1. A handle grip bracket formed from a blank of sheet material, having an intermediate portion and end arm portions, said arm portions being bent up above the intermediate portion, said arm portions being provided with incisions and the material between the ends of the incisions being bent down to straddle a handle and provide leg portions, means for drawing the leg portions toward each other, and a handle grip carried between the arm portions.

2. A handle grip bracket consisting of a blank of sheet material having an intermediate portion which is curved transversely to bear against the exterior surface of a cylindrical shovel handle, said blank having end arm portions which are bent up with relation to the intermediate portion and curved longitudinally, a handle grip secured between the said arm portions, the arm portions being provided with angular incisions, and the material between the ends of the incisions being bent downwardly and curved longitudinally to form legs, said legs adapted to straddle a shovel handle, and the leg portions being provided with parallel extremities, and a traction bolt passing transversely through said extremities.

In testimony whereof I affix my signature.

JOHN LLOYD BURNS.